United States Patent
Nakayoshi et al.

(10) Patent No.: US 6,797,772 B2
(45) Date of Patent: Sep. 28, 2004

(54) ALKENYL POLYORGANOSILOXANE, ORGANOHYDROGENSILOXANE, ORGANOSILICON OR SILANE TREATED SILVER PARTICLES AND PT CATALYST

(75) Inventors: Kazumi Nakayoshi, Chiba Prefecture (JP); Katsutoshi Mine, Chiba Prefecture (JP); Rikako Tazawa, Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 75 days.

(21) Appl. No.: 10/052,760

(22) Filed: Jan. 18, 2002

(65) Prior Publication Data

US 2002/0099114 A1 Jul. 25, 2002

Related U.S. Application Data

(63) Continuation of application No. 08/722,733, filed on Oct. 1, 1996, now abandoned, which is a continuation of application No. 08/318,459, filed on Oct. 5, 1994, now abandoned.

(30) Foreign Application Priority Data

Oct. 6, 1993 (JP) .............................. 5-274892
Oct. 6, 1993 (JP) .............................. 5-274893
Nov. 17, 1993 (JP) .............................. 5-311265

(51) Int. Cl.$^7$ .......................... C08K 9/06; C08L 83/05; C08L 83/06; C08L 83/07
(52) U.S. Cl. .................... 524/731; 523/210; 523/212; 524/730; 524/780; 524/862; 525/474; 525/478
(58) Field of Search ............................... 523/210, 216; 524/730, 731, 780, 862, 212; 525/474, 478; 252/574, 578

(56) References Cited

U.S. PATENT DOCUMENTS

| | | | |
|---|---|---|---|
| 3,445,420 A | * | 5/1969 | Kookootsedes et al. |
| 4,604,424 A | * | 8/1986 | Cole et al. .................. 524/862 |
| 4,801,445 A | | 1/1989 | Fukui et al. .................. 424/69 |
| 5,015,413 A | | 5/1991 | Nagaoka ...................... 252/511 |
| 5,173,765 A | | 12/1992 | Nakayoshi et al. ......... 257/783 |
| 5,182,318 A | | 1/1993 | Savin .......................... 523/216 |
| 5,227,093 A | | 7/1993 | Cole et al. ................. 252/512 |

FOREIGN PATENT DOCUMENTS

| | | |
|---|---|---|
| JP | 59-170617 | 9/1984 |
| JP | 3-049105 | 3/1991 |
| JP | 4-46962 A2 * | 2/1992 |

* cited by examiner

Primary Examiner—Robert Sellers
(74) Attorney, Agent, or Firm—Catherine U. Brown

(57) ABSTRACT

A composition comprises the product obtained by homogeneously blending:

(A) 100 parts by weight of a polyorganosiloxane containing at least two alkenyl radicals per molecule, (B) an organohydrogensiloxane containing at least two silicon-bonded hydrogen atoms per molecule in a quantity sufficient to provide from 0.5 to 3 silicon-bonded hydrogen atoms per alkenyl radical of (A), (C) from 50–2000 parts by weight of silver particles pre-treated with an organosilicon compound selected from the group consisting of (i) alkoxy group(s)-containing silanes and (ii) organosiloxanes, (D) a platinum catalyst, (E) up to 20 weight percent based on the weight of (A) of an organosilicon compound containing at least one silicon-bonded alkoxy group per molecule, and (F) from 0.001 to 5 parts by weight per 100 parts by weight of (A) of a cure inhibitor.

10 Claims, No Drawings

ALKENYL POLYORGANOSILOXANE, ORGANOHYDROGENSILOXANE, ORGANOSILICON OR SILANE TREATED SILVER PARTICLES AND PT CATALYST

This application is a continuation of application Ser. No. 08/722,733 filed Oct. 1, 1996, which is a continuation of application Ser. No. 08/318,459 filed Oct. 5, 1994, both abandoned.

BACKGROUND OF THE INVENTION

Field of the Invention

This invention relates to electrically conductive organosiloxane elastomers. More particularly, this invention relates to storage-stable silver-filled organosiloxane compositions yielding cured electrically conductive elastomers that retain their electrical properties for extended periods of time. The reduced variation of contact resistance and volume resistivity with time exhibited by the elastomers are attributed to the manner in which the silver particles are processed prior to being incorporated into the curable organosiloxane composition.

Elastomers, gels and resins prepared from curable organosiloxane compositions containing finely divided silver particles exhibit high levels electrical conductivity and are therefore used in specialized applications that require materials exhibiting heat resistance, flex resistance, and electrical conductivity.

Japanese Patent Application Laid Open [Kokai or Unexamined] Number Hei 3-170581 [170,581/1991] teaches an electrically conductive silicone rubber composition comprising an organopolysiloxane containing at least 2 alkenyl radicals in each molecule, an organohydrogensiloxane containing at least 2 silicon-bonded hydrogen atoms in each molecule, a platinum-containing hydrosilation catalyst, and silver particles.

The silver particles used to prepare electrically conductive silicone rubber are typically classified as chemically reduced silver, electrolytically reduced, and atomized silver. Chemically reduced silver is prepared by reacting an aqueous silver nitrate solution with a reducing agent such as hydrazine, formaldehyde or ascorbic acid. Electrolytically reduced silver is prepared from aqueous silver nitrate solutions by electrolytic deposition at the cathode. Atomized silver particles are prepared by spraying molten silver maintained at a temperature of at least 1,000° C. into water or an inert gas.

Silver particles are available in the form of granules, flakes, dendrites or amorphous particles. Silver flake is preferably used because it yields silicone rubbers with particularly high electrical conductivities.

Japanese Laid Open Patent Application No. 59/170,167 discloses a method for preparing gold- or silver-filled inks by blending an organic solvent with a powdered form of gold or silver that has been treated with the combination of a methylhydrogen polysiloxane and an amino-functional silicone oil.

U.S. Pat. No. 5,227,093, which issued on Jul. 13, 1993 teaches increasing the electrical conductivity of elastomers and other products prepared from curable organosiloxane compositions containing finely divided silver particles by treating the silver particles with a fatty acid ester prior to blending the silver particles with the other ingredients of the curable composition.

Japanese Laid Open Patent Application No. 03/49,105 describes electrically conductive particles suitable for use with adhesives. The particles exhibit diameters of from 1 to 20 microns and comprise a core of a high polymer on which is deposited a layer of silver followed by a layer of gold. During blending with the ingredients of a curable organosiloxane composition the particles are treated with a silane coupling agent selected from the group consisting of gamma-methacryloxypropyltrimethoxysilane, gamma-mercaptopropyltrimethoxysilane and gamma-chloropropyltrimethoxysilane.

Several problems are associated with the electrically conductive silicone rubber composition taught in Japanese Patent Application Laid Open Number Hei 3-170581 and the other publications mentioned in the immediately preceding paragraphs. When silver in a flake form is used as a filler, it has been found that during storage of the composition not only do the silver particles separate from the composition, but the curability of the composition declines with the passage of time to the point that the composition ultimately becomes uncurable.

Another problem associated with the prior art conductive silicone rubber compositions that the large variations in contact resistance and volume resistivity that occur with the passage of time in cured elastomers prepared using the curable compositions described in this patent publication. This phenomenon renders the rubber unsuitable for use for the continuous electrical connection of electrically conductive elements.

The present inventors have been able to determine that one cause of the variation of electrical properties of silver-filled organosiloxane elastomers with time is the low affinity of silver particles for the other ingredients of the curable composition used to prepare the elastomer.

The present inventors have also been able to confirm that the curability of electrically conductive silicone rubber compositions declines with elapsed time due to the presence of residues of the lubricant that is present during grinding of the silver particles. These lubricant residues remain on the surface and/or in the interior of the particles.

One or more of the following lubricants typically have been used with silver particles during grinding of the particles: saturated and unsaturated higher fatty acids such as lauric acid, myristic acid, palmitic acid, stearic acid, oleic acid, arachidic acid, and behenic acid; metal soaps such as aluminum laurate, aluminum stearate, zinc laurate, and zinc stearate; higher aliphatic alcohols such as stearyl alcohol; the esters of higher aliphatic alcohols and carboxylic acids; higher aliphatic amines such as stearylamine; higher aliphatic amides; and polyethylene waxes.

The present inventors attempted to remove the lubricant remaining on the surface of lubricant-treated silver flake by subjecting the silver particles to repeated washings with organic solvents. The washings did not provide a satisfactory suppression of the timewise variation in the curability of electrically conductive silicone rubber compositions containing this type of silver as a conductive filler.

The present inventors have also confirmed that a decline in adhesion and affinity between the cured silicone elastomer and the silver particles contribute to the timewise variations in, respectively, the contact resistance and volume resistivity of electrically conductive silicone rubbers prepared by curing silver-filled electrically conductive silicone rubber compositions.

As the result of extensive investigations directed at solving the problems described in the preceding paragraphs of this specification, the present inventors discovered that the timewise variation in curability can be suppressed by treating the finely divided silver particles with an organosilicon compound prior to combining the particles with the other ingredients of the curable organosiloxane composition.

The present inventors also discovered that the presence in the curable organosiloxane composition of an organosilicon compound containing silicon-bonded alkoxy groups that is in addition to the compound used to treat the silver particles, further reduces the timewise variations in contact resistance and volume resistivity of the cured elastomer. The present invention is the result of these two discoveries.

One objective of the present invention is to provide silver-filled silicone rubber composition that exhibits excellent values of electrical conductivity in combination with little timewise variation in curability and electrical conductivity. A second objective is to provide a method for treating silver particles intended for use in electrically conductive organosiloxane compositions.

SUMMARY OF THE INVENTION

The objectives of the present invention can be achieved by pretreating the silver particles intended for use in the present organosiloxane compositions with an organosilicon compound prior to combining the particles with the other ingredients of these compositions.

The variation in electrical properties with time exhibited by the curable composition can be further reduced by the presence in the curable composition of an alkoxy-containing organosilicon compound as an additive. This compound is in addition to any used as the organosilicon compound for treatment of the silver particles. An organohydrogensiloxane containing alkoxy groups will function both as this additive and the curing agent for the organosiloxane composition, or an organohydrogensiloxane and an organosilicon compound containing silicon-bonded alkoxy groups can be added as separate ingredients.

The present invention is described in Japanese patent application serial nos. 05/274,892 and 05/274,893, both filed on Oct. 6, 1993; and serial no. 05/311,265, filed on Nov. 17, 1993, on which Applicants base their claim to priority for the present application. The disclosures of these Japanese patent applications is hereby incorporated by reference into this specification.

DETAILED DESCRIPTION OF THE INVENTION

The present invention provides an improved electrically conductive silicone rubber composition comprising (A) 100 parts by weight of a polyorganosiloxane containing at least two alkenyl radicals per molecule,
(B) an organohydrogensiloxane containing at least two silicon-bonded hydrogen atoms in each molecule, in a quantity sufficient to provide from 0.5 to 3 silicon-bonded hydrogen atoms per alkenyl radical present in said polyorganosiloxane,
(C) from 50 to 2,000 parts by weight of finely divided silver particles, and
(D) a platinum-containing hydrosilation catalyst in a quantity sufficient to promote curing of said composition.

The improvement comprises treating the silver particles with an organosilicon compound selected from the group consisting of alkoxysilanes and organosiloxanes prior to combining the particles with the other ingredients of the present curable composition.

The variation in electrical properties with time of cured materials prepared using the present curable compositions can be reduced if the compositions contain up to 20 parts by weight of an organosilicon compound containing silicon-bonded alkoxy groups.

The Treated Silver Particles (Ingredient C)

The characterizing feature of the present curable organosiloxane compositions is the presence of silver particles that have been treated with an organosilicon compound prior to being combined with the other ingredients of the curable organosiloxane composition. In preferred embodiments, the organosilicon compound which is used to pre-treat the silver particles is selected from the group consisting of (i) silanes containing at least one alkoxy group and (ii) organosiloxanes.

The organosilicon compound used to treat the surface of the silver particles, referred to in this specification as ingredient C, is responsible for the electrical conductivity exhibited by silicone rubbers prepared by curing the present compositions, irrespective of the storage time of the curable composition used to prepare the elastomer.

The silver particles can be prepared by the chemical or electrolytic reduction of a silver compound such as silver nitrate, or by atomization of molten silver. The particles treated in accordance with the present invention can be 100 percent pure silver or a silver alloy. Useful silver alloys include silver/copper alloys and silver/palladium alloys. The silver alloys may also contain trace amounts of other metals such as zinc, tin, magnesium, and nickel.

With respect to non-metallic impurities present on the surface of the treated particles, to avoid inhibiting curing of the organosiloxane composition it is particularly preferred that the $NH_4^+$ content not exceed 10 ppm and that the $SO_4^{2-}$ content not exceed 5 ppm.

While no specific restrictions apply to the diameter of the silver particles, average particle diameters in the range of from 0.1 to 10 micrometers are preferred. Because the morphology of ingredient C is likewise not critical, the particles can be in the form of granules, dendrites, flakes or the particles may be amorphous. Mixtures of silver particles exhibiting various morphologies can be used. The flake form of silver is preferred for the preparation of highly electrically conductive cured silicone elastomers.

The organosilicon compound used to treat the surface of the silver particles is not specifically restricted. Examples of suitable treating agents include but are not limited to:

alkoxysilanes such as methyltrimethoxysilane, vinyltrimethoxysilane, 3-glycidoxypropyltrimethoxysilane, 3-methacryloxypropyltrimethoxysilane, dimethyldimethoxysilane, trimethylmethoxysilane, trimethylethoxysilane, tetramethoxysilane, and tetraethoxysilane;

siloxane oligomers such as silanol-endblocked dimethylsiloxane oligomers, silanol-endblocked dimethylsiloxane/methylvinylsiloxane co-oligomers, silanol-endblocked methylvinylsiloxane oligomers, silanol-endblocked methylphenylsiloxane oligomers, 1,3,5,7-tetramethylcyclotetrasiloxane, and 1,3,5,7,9-pentamethylcyclopentasiloxane;

polyorganosiloxanes ranging from low-viscosity liquids to gums, and including but not limited to trimethylsiloxy-endblocked polydimethylsiloxanes, trimethylsiloxy-endblocked dimethylsiloxane/methylvinylsiloxane copolymers, trimethylsiloxy-endblocked dimethylsiloxane/methylphenylsiloxane copolymers, trimethylsiloxy-endblocked polymethylhydrogensiloxanes, trimethylsiloxy-endblocked dimethylsiloxane/methylhydrogensiloxane copolymers, silanol-endblocked polydimethylsiloxanes, silanol-endblocked dimethylsiloxane/methylvinylsiloxane copolymers, silanol-endblocked dimethylsiloxane/methylphenylsiloxane copolymers, silanol-endblocked polymethylhydrogensiloxanes, silanol-endblocked dimethylsiloxane/methylhydrogensiloxane copolymers, dimethylvinylsiloxy-endblocked polydimethylsiloxanes, dimethylvinylsiloxy-endblocked dimethylsiloxane/ methylvinyl-siloxane copolymers, dimethylvinylsiloxy-endblocked dimethylsiloxane/methylphenylsiloxane copolymers, dimethylhydrogensiloxy-endblocked polymethylhydrogensiloxanes, and dimethylhydrogensiloxy-endblocked dimethylsiloxane/methylhydrogensiloxane copolymers; and silicone resins, including but not limited to resins composed of $R_3SiO_{1/2}$ and $SiO_{4/2}$ units, silicone resins composed of the $RSiO_{3/2}$ unit, resins composed of the $R_2SiO_{2/2}$ and $RSiO_{3/2}$ units, and resins composed of the $R_2SiO_{2/2}$, $RSiO_{3/2}$, and $SiO_{4/2}$ units.

The organosilicon compounds used to treat the silver particles can be used singly or as mixtures of two or more compounds. The group represented by R in the units of the silicone resins represents any of the substituted and unsubstituted monovalent hydrocarbon discussed in the section of this specification relating to the alkenyl-containing polyorganosiloxane, referred to in this specification as ingredient A.

Silicone resins used as silver treating agents in accordance with the present invention are preferably solids that soften at above room temperature, most preferably within the range from 50° C. to 150° C.

The thickness of the coating of the organosilicon compound or a polycondensation product of this compound that is formed during treatment of the silver particles is not critical. The conductivity of cured silicone elastomers prepared from the filled silicone rubber compositions is typically inversely proportional to the thickness of the coating, however thinner films reduce the affinity between the treated silver particles and the other ingredients of curable organosiloxane compositions, resulting in larger decreases with the passage of time in the curability of these compositions.

For these reasons, while the optimal coating thickness will be dependent upon the particular end-used application, thicknesses not exceeding 0.1 micrometer are preferred. In order to obtain highly electrically conductive cured silicone rubber, the excess organosilicon compound or polycondensation products of this compound should be removed from the surface of the silver particles by washing the particles with a suitable organic solvent.

The method for treating the silver particles with the organosilicon compound is not critical. As an example, the surface of the silver particles can be wetted with the compound in the absence of any solvent or with a solution of a liquid or solid organosilicon compound in a suitable organic liquid.

The present treatment method is suitable for silver particles prepared by chemical or electrolytic reduction or by atomization or other means for preparing finely divided particles of from molten silver and it alloys.

Chemically reduced silver particles can be prepared, for example, by the reduction of an aqueous silver nitrate solution with a chemical reducing agent such as hydrazine, formaldehyde, or ascorbic acid.

Electrolytically reduced silver is in the form of dendrites that are deposited on the cathode during the electrolysis of an aqueous silver nitrate solution.

Atomized silver particles can be prepared by spraying molten silver heated to at least 1,000° C. into water or inert gas.

No specific restrictions apply to the technique for wetting the silver particles with the neat organosilicon compound or solutions of this compound in a suitable organic liquid. Suitable treatment techniques include but are not limited to spraying the silver particles with a neat or solubilized organosilicon compound, immersing the silver particles in a neat or solubilized organosilicon compound, and grinding the silver particles using the neat or solubilized organosilicon compound as a lubricant.

Methods involving grinding are preferred, because they produce a flake form of silver that is particularly suitable for preparing highly electrically conductive silicone rubber. The grinding process yields particularly desirable results for the silver flake product. During grinding of silver particles in the form of flakes the organosilicon compound functions not only as a surface-treatment agent, but it also functions to accelerate flake formation by becoming adsorbed onto the activated surface of the flakes, thereby inhibiting aggregation of the flakes into larger particles.

The device for grinding the silver particles is not critical. Useful devices for this purpose include but are not limited to stamping mills, ball mills, vibratory mills, hammer mills, roll mills, and the combination of a mortar and pestle.

The conditions for milling the silver particles are not specifically restricted. The conditions will be dependent at least in part on the diameter and shape of the silver particles. Grinding is preferably conducted while cooling the grinder due to the heat generated during this operation. The silver particles produced by this process are in the form of flakes that preferably have a diameter in the range of from 0.1 to 10 micrometers.

To facilitate formation of the desired thin coating of the organosilicon compound on the silver particles or when the compound has a relatively high viscosity, the compound(s) used to treat the particles is preferably dissolved in a suitable organic liquid. No specific restrictions apply to organic solvents usable for this purpose. Suitable solvents include but are not limited to alcohols such as methanol, ethanol, and isopropanol; aliphatic compounds such as hexane, heptane, and octane; alicyclic compounds such as cyclohexane and cyclooctane; aromatic compounds toluene and xylene; ketones such as acetone, methyl ethyl ketone, and methyl isobutyl ketone; and esters such as ethyl acetate, and Carbitol acetate.

No specific restrictions apply to the conditions for treating the surface of the silver particles with an organosilicon compound during the preparation of ingredient C. Treatment of the particles is preferably carried out at temperatures from ambient to 100° C., preferably at least 50° C., for periods from 24 to 150 hours.

To facilitate drying and also remove excess organosilicon compound adhering on the surface of the silver particles, the treated silver particles are preferably washed with any of the organic solvent listed in the preceding paragraph of this specification and then dried for at least 24 hours at temperatures from ambient to 105° C.

The concentration of the treated silver particles (ingredient C) in the present compositions is typically from 50 to 2,000 parts by weight, preferably from 300 to 600 parts, per 100 parts by weight of the polyorganosiloxane referred to in this specification as ingredient A. When the concentration of ingredient C is less than 50 parts per 100 parts of ingredient A, there is a substantial decline in the electrical conductivity of the cured silicone rubber product.

When the concentration of ingredient C exceeds 2,000 weight parts per 100 weight parts of ingredient A there is typically a substantial decline in the fluidity of the corresponding composition and the ability to process the composition into a suitable cured elastomer becomes very problematic.

The Alkenyl-Substituted Polyorganosiloxane (Ingredient A)

The alkenyl-substituted polyorganosiloxane is referred to as ingredient A of the present curable compositions. This ingredient contains at least 2 alkenyl radicals in each molecule. Suitable alkenyl radicals include but are not limited to vinyl, allyl, butenyl, pentenyl, hexenyl, and heptenyl, with vinyl being preferred. The location of the alkenyl radicals in the molecules of ingredient A can be at the molecular chain terminals, on non-terminal silicon atoms, or at both positions.

No specific restrictions apply to the silicon-bonded organic groups other than alkenyl radicals. These groups are substituted or unsubstituted monovalent hydrocarbon radicals that include but are not limited to alkyl such as methyl, ethyl, propyl, butyl, pentyl and hexyl; aryl such as phenyl, tolyl and xylyl; aralkyl groups such as benzyl and phenethyl; and haloalkyl groups such as 3-chloropropyl, and 3,3,3-trifluoropropyl. Of these radicals, methyl and phenyl are preferred.

The molecular structure of ingredient A is also not critical and is specifically exemplified by straight chains, partially branched straight chains, branched chains, and network type resin structures. Straight-chain and partially branched straight-chain structures are preferred.

The viscosity of ingredient A is not critical. Typical polymers exhibit viscosity values, measured at 25° C., in the range from 50 to 500,000 centipoise (0.05 to 500 Pa.s) while particularly preferred values fall in the range of from 400 to 100,000 centipoise (0.4 to 100 Pa.s)

Specific polyorganosiloxanes suitable for use as ingredient A include but are not limited to trimethylsiloxy-endblocked dimethylsiloxane/methylvinylsiloxane copolymers, trimethylsiloxy-endblocked polymethylvinylsiloxanes, trimethylsiloxy-endblocked methylvinylsiloxane/methylphenylsiloxane copolymers, trimethylsiloxy-endblocked dimethylsiloxane/methylvinylsiloxane/methylphenylsiloxane copolymers, dimethylvinylsiloxy-endblocked polydimethylsiloxanes, dimethylvinylsiloxy-endblocked polymethylvinylsiloxanes, dimethylvinylsiloxy-endblocked polymethylphenylsiloxanes, dimethylvinylsiloxy-endblocked dimethylsiloxane/methylvinylsiloxane copolymers, dimethylvinylsiloxy-endblocked dimethylsiloxane/methylphenylsiloxane copolymers, silanol-endblocked dimethylsiloxane/methylvinylsiloxane copolymers, silanol-endblocked polymethylvinylsiloxanes, and silanol-endblocked dimethylsiloxane/methylvinylsiloxane/methylphenylsiloxane copolymers.

Alkenyl-substituted organosiloxane resins suitable for use as ingredient A include but are not limited to resins composed of the combination $R_3SiO_{1/2}$ and $SiO_{4/2}$ units, the $RSiO_{3/2}$ unit alone, the combination of $R_2SiO$ and $RSiO_{3/2}$ units, the combination of $R_2SiO$, $RSiO_{3/2}$ and $SiO_{4/2}$ units, and mixtures containing two or more of these resins.

The monovalent hydrocarbon radicals represented by R in the preceding formula can be substituted or unsubstituted, and include but are not limited to alkyl such as methyl, ethyl, propyl, butyl, pentyl and octyl; alkenyl such as vinyl, allyl, butenyl, pentenyl and hexenyl; aryl such as phenyl, tolyl and xylyl, and haloalkyl such as 3-chloropropyl and 3,3,3-trifluoropropyl. The only proviso is that at least one of the R groups represents an alkenyl radical.

The Organohydrogensiloxane (Ingredients B and B')

The organohydrogensiloxanes referred to in this specification as ingredients B and B' function as crosslinkers that are responsible for curing of the present compositions. The organohydrogensiloxane should contain at least 2 silicon-bonded hydrogen atoms in each molecule. The location of these silicon-bonded hydrogen atoms is not critical, and they may be located, for example, at the molecular chain terminals or on non-terminal silicon atoms or at both positions.

No specific restrictions apply to the silicon-bonded organic groups in ingredient B, which are substituted and unsubstituted monovalent hydrocarbon radicals. Specific radicals are listed in the preceding section of this specification relating to ingredient A, with the exception that alkenyl and other ethylenically unsaturated radicals are excluded.

As discussed in connection with ingredient A of the present compositions, the molecular structure of ingredient B is likewise not critical and is specifically exemplified by straight chain, partially branched straight chain, branched, and network. Straight-chain and partially branched straight-chain structures are preferred.

The viscosity of ingredient B critical is not critical, however preferred viscosity values, measured at 25° C. are in the range of from 1 to 50,000 centipoise, (0.001 to 50 Pa.s) with particularly preferred values being in the range of 5 to 1,000 centipoise (0.005 to 1 Pa.s).

Examples of organohydrogensiloxanes suitable for use as trimethylsiloxy-endblocked polymethylhydrogensiloxanes, trimethylsiloxy-endblocked dimethylsiloxane/methylhydrogensiloxane copolymers, trimethylsiloxy-endblocked methylhydrogensiloxane/methylphenylsiloxane copolymers, trimethylsiloxy-endblocked dimethylsiloxane/methylhydrogensiloxane/methylphenylsiloxane copolymers, dimethylhydrogensiloxy-endblocked polydimethylsiloxanes, dimethylhydrogensiloxy-endblocked polymethylhydrogensiloxanes, dimethylhydrogensiloxy-endblocked dimethylsiloxane/methylhydrogensiloxane copolymers, dimethylhydrogensiloxy-endblocked dimethylsiloxane/methylphenylsiloxane copolymers, dimethylhydrogensiloxy-endblocked polymethylphenylsiloxanes, silanol-endblocked polymethylhydrogensiloxanes, silanol-endblocked dimethylsiloxane/methylhydrogensiloxane copolymers, silanol-endblocked methylhydrogensiloxane/methylphenylsiloxane copolymers, and silanol-endblocked dimethylsiloxane/ methylhydrogensiloxane/methylphenylsiloxane copolymers.

In an alternative embodiment of ingredient B, referred to as ingredient B', the organohydrogensiloxane functions both as an adhesion promoter and as a crosslinker for the curable composition. Each molecule of ingredient B' must contain at least 2 silicon-bonded hydrogen atoms and at least 1 silicon-bonded alkoxy group. The location of the silicon-bonded hydrogen atoms in ingredient B' is not critical. These hydrogen atoms may be bonded, for example, to terminal or non-terminal silicon atoms or at both of these positions. The bonding position for the silicon-bonded alkoxy groups in ingredient B' is also not critical, and this group may be bonded to terminal and/or non-terminal silicon atoms.

The silicon-bonded organic groups that can be present in ingredient B' are free of ethylenic unsaturation and are specifically exemplified by but not limited to the monovalent substituted and unsubstituted hydrocarbon radicals that can be present in ingredient B. Ingredient B' can contain other adhesion-promoting groups that will not interfere with curing of the present compositions. These additional adhesion-promoting groups include but are not limited to epoxy groups that are bonded to a silicon atom by means of a carbon atom that is not part of the epoxide ring.

The molecular structure of ingredient B' includes but is not limited to straight chains, partially branched straight chains, branched chains, cyclic and network structures. Mixtures of polyorganosiloxanes having two or more types of structures can be used. While the viscosity of ingredient B' is not critical, viscosities of from 1 to 50,000 centipoise (0.001 to 50 Pa.s), measured at 25° C., are preferred, the range from of 5 to 1,000 centipoise (0.005 to 1 Pa.s) being particularly preferred.

Polyorganosiloxanes suitable for use as ingredient B' include but are not limited to the following structures.

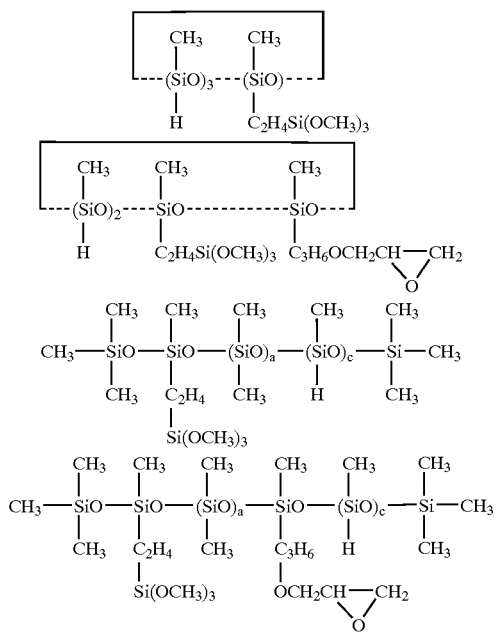

In the foregoing formulae a represents an integer with a value of at least 1, and c represents an integer with a value of at least 2.

No particular restrictions apply to the method for preparing ingredient B'. Suitable methods include but are not limited to (a) the platinum-catalyzed addition of an alkenyl-containing alkoxysilane to a portion of the silicon-bonded hydrogen atoms of an organohydrogensiloxane containing at least 3 silicon-bonded hydrogen atoms in each molecule, and (b) the platinum-catalyzed addition of an alkenyltrialkoxysilane and an alkenyl-containing epoxy compound to a portion of the silicon-bonded hydrogen atoms of an organohydrogensiloxane containing at least 4 silicon-bonded hydrogen atoms in each molecule.

Platinum catalysts useful for preparing ingredient B' include the same catalysts described in the preceding section of this specification relating ingredient D. Polyorganosiloxanes containing at least three or four silicon-bonded hydrogen atoms and suitable for use in preparing ingredient B' include but are not limited to trimethylsiloxy-endblocked polymethylhydrogensiloxanes, trimethylsiloxy-endblocked dimethylsiloxane- methylhydrogensiloxane copolymers, dimethylhydrogensiloxy-endblocked polymethylhydrogensiloxanes, dimethylhydrogensiloxy-endblocked dimethylsiloxane-methylhydrogensiloxane copolymers, cyclic methylhydrogensiloxanes, and cyclic dimethylsiloxane-methylhydrogensiloxane copolymers.

Alkenyl-containing alkoxysilanes suitable for use in preparing ingredient B' include but are not limited to vinyltrimethoxysilane, vinyltriethoxysilane, vinylmethyldimethoxysilane, vinyldimethylmethoxysilane, allyltrimethoxysilane, allyltriethoxysilane, allylmethyldimethoxysilane, allyldimethylmethoxysilane, and butenyltrimethoxysilane.

Alkenyl-containing epoxy compounds suitable for use in preparing ingredient B' include but are not limited to vinyl glycidyl ether, allyl glycidyl ether, butenyl glycidyl ether, 3,4-epoxycyclohexylethene, 3-(3,4-epoxycyclohexyl)propene, and 4-(3,4-epoxycyclohexyl)butene.

Because ingredient B' must contain at least two silicon bonded hydrogen atoms per molecule, the total number of moles of alkenyl-containing alkoxysilane and alkenyl-containing epoxy compound used to prepare this ingredient must be at least two less than the number of moles of silicon-bonded hydrogen present in the initial organohydrogensiloxane.

The concentration of ingredients B and B' in the present compositions is sufficient to provide from 0.5 to 3 silicon-bonded hydrogen atoms per alkenyl group in ingredient A. The composition will not cure adequately when ingredients B and B' provide fewer than 0.5 silicon-bonded hydrogen atoms per alkenyl radical in ingredient A. At the other extreme, the presence in the curable composition of more than 3 silicon-bonded hydrogen atoms per alkenyl group in ingredient A yields a cured electrically conductive silicone rubber with a drastically reduced heat resistance.

The Platinum-Containing Hydrosilation Catalyst (Ingredient D)

The platinum containing hydrosilation catalyst, also referred to in this specification as ingredient D, accelerates the cure of the present compositions. Any metal from the platinum group of the periodic table capable of functioning as catalysts for hydrosilation reactions can be used as ingredient D. Suitable catalysts include but are not limited to platinum black, platinum supported on powdered alumina, platinum supported on powdered silica, platinum supported on powdered carbon, chloroplatinic acid, alcohol solutions of chloroplatinic acid, chloroplatinic acid/olefin complexes, chloroplatinic acid/vinylsiloxane complexes, and platinum catalysts dispersed in microparticulate forms of thermoplastic organic resins such as methyl methacrylate resins, polycarbonate resins, polystyrene resins, and silicone resins.

The concentration of ingredient D in the present compositions is typically not critical so long as it is sufficient to promote curing of the composition, and is typically equivalent to from 1 to 100 ppm of platinum metal, based on the combined weights of ingredients A and B.

The Optional Alkoxy-Functional Organosilicon Compound (Ingredients E and E')

Curable compositions of the present invention can contain only ingredients A–D, however an organosilicon compound containing at least one silicon-bonded alkoxy group per molecule, referred to in this specification as ingredients E and E', is preferably included in the present compositions to diminish the timewise variations in contact resistance and volume resistivity values exhibited by cured materials prepared from these compositions. Ingredient E is used when ingredient B is present as the organohydrogensiloxane and ingredient E' is used in combination with ingredient B'.

Examples of suitable organosilicon compounds suitable for use as ingredient E include but are not limited to alkoxysilanes such as tetramethoxysilane, tetraethoxysilane, dimethyldimethoxysilane, methylphenyldimethoxysilane, methylphenyldiethoxysilane, phenyltrimethoxysilane, methyltrimethoxysilane, methyltriethoxysilane, vinyltrimethoxysilane, allyltrimethoxysilane, allyltriethoxysilane, 3-glycidoxypropyltrimethoxysilane, 3-methacryloxypropyltrimethoxysilane and organosilicon compounds with the following formulae:

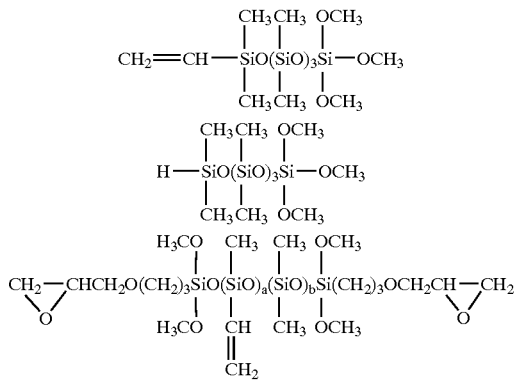

wherein a and b are each integers with values of at least 1

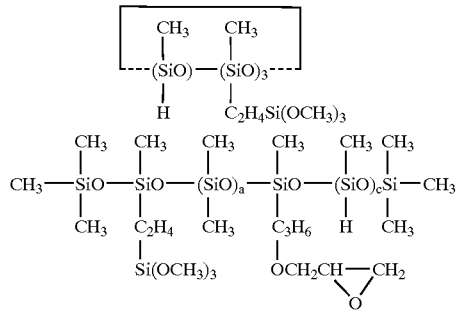

where a is an integer with a value of at least 1 and c is 0 or 1.

Ingredient E' can be present as an optional ingredient when ingredient B' is used as the organohydrogensiloxane. Ingredient E' is an organosilicon compound that contains silicon-bonded alkoxy groups and either 1 or no silicon-bonded hydrogen. Ingredient E' can be any of the organosilicon compounds suitable for use as ingredient E that contain a maximum of one silicon-bonded hydrogen atom.

When they are present, the concentrations of ingredients E and E' are up to 20 weight percent, based on the weight of ingredient A, preferably from 0.5 to 8 weight percent. The appearance of timewise variations in the contact resistance and volume resistivity values of the cured elastomer becomes a possibility when ingredient E or E' is not present. On the other hand, the addition of more than 20 weight percent of ingredient E or E' based on ingredient A results in a decline in the storage stability of the resulting composition and also in an increase in the hardness of the cured elastomer with elapsed time.

Other Optional Ingredients

A cure inhibitor may also be added to the instant composition as an optional ingredient to improve the storage stability and handling characteristics of the curable composition. Suitable cure inhibitors include but are not limited to alkynyl alcohols such as 3-methyl-1-butyn-3-ol, 3,5-dimethyl-1-hexyn-3-ol and phenylbutynol; ene-yne compounds such as 3-methyl-3-penten-1-yne and 3,5-dimethyl-3-hexen-1-yne; and 1,3,5,7-tetramethyl-1,3,5,7-tetravinylcyclotetrasiloxane, 1,3,5,7-tetramethyl-1,3,5,7-tetrahexenylcyclotetrasiloxane, and benzotriazole.

These cure inhibitors are preferably added at 0.001 to 5 weight parts per 100 weight parts of ingredient A.

The present curable compositions can also include an inorganic filler to impart a suitable hardness and strength to the cured elastomer. Suitable inorganic fillers include but are not limited to fumed silica, crystalline silica, calcined silica, wet-process silica, fumed titanium oxide, and carbon black, and by inorganic filler whose surface has been treated with an organosilicon compound such as an organoalkoxysilane, organochlorosilane or an organodisilazane.

These inorganic fillers are preferably added at no more than 50 weight parts per 100 weight parts of ingredient A.

The elastomers prepared using the present curable organosiloxane compositions typically exhibit volume resistivities below 0.1 ohm-cm, preferably below $1 \times 10^{-3}$ ohm-cm, and are useful as electrically conductive adhesives, electrically conductive die-bonding agents, as heat-dissipating die-bonding agents, and as electromagnetic-shielding agents.

The following examples describe preferred compositions of the present invention and electrically conducting elastomers prepared using these compositions, and should not be interpreted as limiting the scope of the present invention as defined in the accompanying claims. Unless otherwise specified all parts and percentages are by weight and reported viscosity values were measured at 25° C.

The following methods were used to measure the various properties of the curable organosiloxane compositions and the electrically conductive cured elastomers prepared using these compositions.

Appearance of the Electrically Conductive Silicone Rubber Compositions

The electrically conductive silicone rubber compositions were stored in transparent glass bottles that were maintained under refrigeration. The appearance of the composition was inspected immediately after preparation (initial evaluation) and following 1 month, 3 months, and 6 months storage.

Curability of the Compositions

The curable electrically conductive composition were stored under refrigeration after being prepared. Samples were taken from the compositions immediately following their preparation (initial evaluation) and after 1, 3, and 6 months, and cured elastomers were prepared from these samples by heating them for 30 minutes at 150° C. The curability of the compositions was evaluated by measuring the hardness of the cured elastomers using a JIS A hardness meter in accordance with JIS K 6301.

Contact Resistance of the Silicone Rubbers

Each of the curable compositions was coated on one surface of a circuit board and heated for 30 minutes at 150° C. to produce a cured elastomer. The contact resistance of the silicone rubber was then measured using the "4-point method" to give the initial value. The contact resistance of the silicone rubber was measured by the same method after the elastomer-coated circuit board had been heated for 100 hours, 500 hours, and 1,000 hours in an oven maintained at 150° C.

Volume Resistivity of the Silicone Rubbers

An electrically conductive elastomer in the form of a sheet with a thickness at least 1 mm was prepared by heating the curable silver-filled organosiloxane compositions at 150° C. for 30 minutes. The initial volume resistivity of this silicone rubber sheet was measured using a model K-705RL meter from Yugen Kaisha Kyowa Riken). In order to measure the timewise variation in the volume resistivity of the silicone rubber, the volume resistivity of each of the elastomer sheets was measured by the same method after the sheets had been held for 100 hours, 500 hours, and 1,000 hours in a 150° C. oven.

Adhesion of the Cured Elastomers

The adhesion of the electrically conductive silicone elastomers was measured using a tab bonding test. In accordance with this test method, the curable compositions to be evaluated were heated for 30 minutes at 150° C. on an aluminum plate to form a silicone rubber bead measuring 20 mm in width, 20 mm in length and 5 mm in thickness. This cured elastomeric bead was then peeled from the aluminum plate, and the surface that had been in contact with the heated plate was examined. A rating of "CF" indicate the occurrence of cohesive failure within the body of the elastomer, leaving the plate covered with cured elastomer. A rating of "AF" refers to adhesive failure that occurred only at the interface between the elastomer and the aluminum heating surface. A rating of "partial AF" indicates only partial interfacial failure and some within the body of the cured elastomer, and a score of "TCF" refers to the presence of a thin layer of silicone rubber adhering to the aluminum plate.

The evaluation results for curable compositions and elastomers of the present invention are recorded in Table 1 and the evaluation results for the comparative examples are recorded in Table 2.

EXAMPLE 1

20 g of silver nitrate were dissolved in 40 mL water, from which granular silver oxide was subsequently precipitated by the addition of a 46% aqueous solution of sodium hydroxide. This granular silver oxide was reduced with formalin, and the product was repeatedly washed and filtered to yield a granular form of reduced silver with an average particle diameter of 1 micrometer. The silver particles were then immersed in a Carbitol acetate solution of a dimethylsiloxane/phenylsiloxane resin exhibiting a softening point of 90° C. and the average unit formula

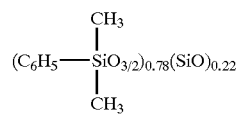

$(C_6H_5 = phenyl)$

Following surface treatment using the methylphenylsiloxane resin, the silver particles were recovered on filter paper and then dried at room temperature to yield granular silver particles with an average particle diameter of 1 micrometer.

A curable organosiloxane composition of this invention was prepared by blending the following ingredients to homogeneity:

600 parts by weight of the treated silver particles described in the immediately preceding paragraph,
100 parts by weight of a dimethylvinylsiloxy-endblocked dimethylpolysiloxane with a viscosity of 2,000 centipoise and a vinyl content of 0.2 weight percent,
1 part by weight of a trimethylsiloxy-endblocked methylhydrogen-polysiloxane exhibiting a viscosity of 30 centipoise and containing 1.5 weight percent of silicon-bonded hydrogen,
7 parts by weight of 3-glycidoxypropyltrimethoxysilane, a quantity of a chloroplatinic acid/vinylsiloxane complex, equivalent to 5 ppm of complexed platinum metal in the composition, and
300 ppm, based on the weight of the curable composition, of phenylbutynol as a catalyst inhibitor.

The appearance and curability of the resultant curable composition were evaluated together with the adhesion, contact resistance and volume resistivity of the elastomer prepared by curing the composition. The results of these evaluations are reported in Table 1.

COMPARATIVE EXAMPLE 1

20 g silver nitrate was dissolved in 40 mL water, from which granular silver oxide was subsequently precipitated by the addition of 46% aqueous sodium hydroxide. This granular silver oxide was reduced with formalin, and the product was repeatedly washed and filtered to yield granular reduced silver particles with an average particle diameter of 1 micrometer.

A curable organosiloxane composition outside the scope of the present invention was prepared by mixing the types and amounts of ingredients described in Example 1 of this specification to homogeneity using the silver particles prepared as described in the immediately preceding paragraph.

The appearance and curability of the resultant curable organosiloxane composition together with the adhesion, contact resistance and volume resistivity of the cured elastomer prepared from this composition were evaluated and the results are reported in Table 2.

EXAMPLE 2

20 g silver nitrate was dissolved in 40 mL water, from which granular silver oxide was subsequently precipitated by the addition of 46% aqueous sodium hydroxide. This granular silver oxide was reduced with formalin, and the product was repeatedly washed and filtered to yield a granular reduced silver particles with an average particle diameter of 1 micrometer. The particles were was ground in a ball mill using as the lubricant a Carbitol acetate solution of the dimethylsiloxane/phenylsiloxane resin described in Example 1 of this specification.

After surface treatment of the silver particles, the particles were washed with xylene to obtain particles in the form of flakes with an average particle diameter of 8 micrometers.

An electrically conductive silicone rubber composition was subsequently prepared by mixing the types and amounts of ingredients described in Example 1 of this specification to homogeneity using the silver particles prepared as described in the immediately preceding paragraph.

The appearance and curability of the resultant curable composition together with the adhesion, contact resistance and volume resistivity of the elastomer obtained by curing the composition were evaluated and the results are reported in Table 1.

COMPARATIVE EXAMPLE 2

20 g silver nitrate were dissolved in 40 mL water, from which granular silver oxide was subsequently precipitated by the addition of 46% aqueous sodium hydroxide. This granular silver oxide was reduced with formalin, and the product was repeatedly washed and filtered to yield a granular reduced silver particles with an average particle diameter of 1 micrometer. The reduced silver particles were ground in a ball mill using as lubricant a Carbitol acetate solution of stearic acid. Following surface treatment with stearic acid, the silver particles were washed with methanol to yield silver flake with an average particle diameter of 8 micrometers.

A curable organosiloxane composition outside the scope of the present invention was prepared by mixing the types and amounts of ingredients described in Example 1 of this specification to homogeneity using the silver particles prepared as described in the immediately preceding paragraph.

The appearance and curability of the resultant curable composition together with the adhesion, contact resistance and volume resistivity of the elastomer prepared by curing the composition were evaluated and the results are reported in Table 2.

EXAMPLE 3

Granular silver particles prepared by atomization in water were ground in a ball mill using as a lubricant the xylene solution of a dimethylvinylsiloxy-endblocked polydimethylsiloxane exhibiting a viscosity 100 centipoise (0.1 Pa.s). Following this treatment, the silver particles were washed with xylene to yield silver flakes with an average particle diameter of 10 micrometers.

A curable organosiloxane composition of the present invention was prepared by blending the following ingredients to homogeneity 960 weight parts of the silver flake prepared as above, 100 parts by weight of a dimethylvinylsiloxy-endblocked dimethylpolysiloxane with a viscosity of 2,000 centipoise (2 Pa.s) and a vinyl content of 0.2 weight percent,
1 part by weight of a trimethylsiloxy-endblocked polymethylhydrogensiloxane with a viscosity of 30 centipoise and a silicon-bonded hydrogen content of 1.5 weight percent,
7 parts by weight of 3-glycidoxypropyltrimethoxysilane,
a quantity of a chloroplatinic acid/vinylsiloxane complex sufficient to provide 5 ppm, based on the total weight of the curable composition, of complexed platinum metal in the composition, and
300 ppm, based on the weight of the curable composition, of phenylbutynol as the catalyst inhibitor.

The appearance and curability of the resultant curable composition together with the adhesion, contact resistance and volume resistivity of the elastomer prepared by curing the composition were evaluated and the results are reported in Table 1.

EXAMPLE 4

20 g silver nitrate was dissolved in 40 mL water, from which granular silver oxide was subsequently precipitated by the addition of 46% aqueous sodium hydroxide. This granular silver oxide was reduced with formalin, and the product was repeatedly washed and filtered to yield a granular reduced silver particles with an average diameter of 3 micrometers. These particles were ground in a ball mill using as lubricant the Carbitol acetate solution of a dimethylvinylsiloxy-endblocked dimethylpolysiloxane (viscosity=100 centipoise). After its surface treatment with dimethylpolysiloxane, the silver particles were washed with Carbitol acetate to yield a silver flake with an average particle diameter of 4 micrometers.

A curable organosiloxane composition of the present invention was prepared by blending the following ingredients to homogeneity:

400 parts by weight of the silver flake prepared as described in the immediately preceding paragraph,
100 parts by weight of mixture containing a) a dimethylvinylsiloxy-endblocked polydimethylsiloxane and b) an organosiloxane resin containing trimethylsiloxy, dimethylvinylsiloxy and $SiO_{4/2}$ units, the mixture exhibiting a viscosity of 8,000 centipoise (8 Pa.s) and a vinyl content of 0.8 weight percent;
5 parts by weight of a trimethylsiloxy-endblocked polymethyl-hydrogensiloxane with a viscosity of 30 centipoise (0.03 Pa.s) and a silicon-bonded hydrogen content of 1.5 weight percent,
10 parts by weight of an organosilicon compound with the formula

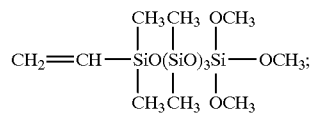

a quantity of a chloroplatinic acid/vinylsiloxane complex equivalent to 5 ppm of complexed platinum metal, based on the total weight of the curable composition, and
30–0 ppm, based on the total weight of the curable composition, of phenylbutynol as the catalyst inhibitor.

The appearance and curability of the resultant curable composition together with the adhesion, contact resistance and volume resistivity of the elastomer prepared by curing the composition were evaluated and the results are reported in Table 1.

COMPARATIVE EXAMPLE 3

20 g of silver nitrate was dissolved in 40 mL water, from which granular silver oxide was subsequently precipitated by the addition of 46% aqueous sodium hydroxide. This granular silver oxide was reduced with formalin, and the product was repeatedly washed and filtered to yield granular reduced silver particles with an average particle diameter of 3 micrometers. These reduced silver particles were ground in a ball mill using stearic acid as the lubricant. After its surface treatment with stearic acid, the silver particles were washed with xylene to yield a particles in the form of flakes with an average particle diameter of 4 micrometers.

A curable organosiloxane composition outside the scope of the present invention was prepared by blending the following ingredients to homogeneity:

450 parts by weight of the silver flakes described in the immediately preceding paragraph,
100 parts by weight of a mixture containing a) a dimethylvinylsiloxy-endblocked polydimethylsiloxane and b) an organosiloxane resin containing trimethylsiloxy, dimethylvinylsiloxy and $SiO_{4/2}$ units, the mixture exhibiting a viscosity of 8,000 centipoise (8 Pa.s) and a vinyl content of 0.8 weight percent;
5 parts by weight of a trimethylsiloxy-endblocked polymethylhydrogensiloxane with a silicon-bonded hydrogen content of 1.5 weight percent and a viscosity of 30 centipoise,
10 parts by weight of an organosilicon compound with the formula

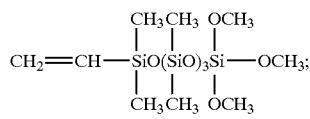

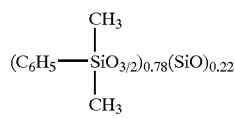

($C_6H_5$ = phenyl)

a quantity of a chloroplatinic acid/vinylsiloxane complex equivalent to 5 ppm, based on the total weight of the curable composition, of complexed platinum metal in the composition, and 300 ppm, based on the total weight of the curable composition, of phenylbutynol as the catalyst inhibitor.

The appearance and curability of the resultant curable composition together with the adhesion, contact resistance and volume resistivity of the elastomer prepared by curing the composition were evaluated and the results are reported in Table 2.

EXAMPLE 5

20 g silver nitrate was dissolved in 40 mL water, from which granular silver oxide was subsequently precipitated by the addition of 46% aqueous sodium hydroxide. This granular silver oxide was reduced with formalin, and the product was repeatedly washed and filtered to yield granular reduced silver particles with an average particle diameter of 1 micrometer. These particles were ground in a ball mill using a methanol solution of vinyltrimethoxysilane as the lubricant. Following this treatment the silver particles were washed with methanol to yield silver flake with an average particle diameter of 2 micrometers.

An electrically conductive silicone rubber composition according to the invention was subsequently prepared by mixing the following to homogeneity: 400 parts by weight of the silver particles described in the immediately preceding paragraph, 100 parts by weight of a dimethylvinylsiloxy-endblocked polydimethylsiloxane with a viscosity of 2,000 centipoise ( )2 Pa.s) and a vinyl content of 0.2 weight percent, 1 weight part trimethylsiloxy-endblocked polymethylhydrogensiloxane with a viscosity of 30 centipoise (0.03 Pa.s) and a silicon-bonded hydrogen content of 1.5 weight percent, 7 parts by weight of 3-glycidoxypropyltrimethoxysilane, a quantity of a chloroplatinic acid/vinylsiloxane complex equivalent to 5 ppm, based on the total weight of the curable composition, of complexed platinum metal in the composition, and 300 ppm, based on the total weight of the curable composition, of phenylbutynol as the catalyst inhibitor.

The appearance and curability of the resultant curable composition together with the adhesion, contact resistance and volume resistivity of the elastomer prepared by curing the composition were evaluated and the results are reported in Table 1.

EXAMPLE 6

Dendritic electrolytic silver particles with an average particle diameter of 10 micrometers was ground in a ball mill using as the lubricant a Carbitol acetate solution of a dimethylsiloxane/phenylsiloxane resin exhibiting a softening point of 90° C. and the average unit formula.

Following this surface treatment the silver particles were washed with xylene to yield silver flake with an average particle diameter of 12 micrometers.

A curable composition of the present invention was prepared by blending the following ingredients to homogeneity:

400 parts by weight of the silver particles described in the immediately preceding paragraph;
100 parts of a dimethylvinylsiloxy-endblocked polydimethylsiloxane with a viscosity of 2,000 centipoise (2 Pa.s) and a vinyl content of 0.2 weight percent,
1 part by weight of a trimethylsiloxy-endblocked polymethylhydrogensiloxane with a viscosity of 30 centipoise (0.03 Pa.s) and a silicon-bonded hydrogen content of 1.5 weight percent, 7 parts by weight of 3-glycidoxypropyltrimethoxysilane,
a quantity of a chloroplatinic acid/vinylsiloxane complex equivalent to 5 ppm, based on the total weight of the curable composition, of complexed platinum metal, and
300 ppm. based on the total weight of the curable composition, of phenylbutynol as a catalyst inhibitor.

The appearance and curability of the resultant curable composition together with the adhesion, contact resistance and volume resistivity of the elastomer prepared by curing the composition were evaluated and the results are reported in Table 1.

EXAMPLE 7

100 g reduced silver particles in flake form with an average particle diameter=4 micrometers were placed in a flask, followed by the addition of 170 g heptane, 0.5 g tetrabutyl titanate, and 5 g trimethylethoxysilane. After stirring at room temperature for 4 hours the silver particles were isolated by filtration. The treated particles were washed with methanol and then dried at 35° C. for 48 hours to yield silver flake with an average particle diameter of 4 micrometers.

A curable organosiloxane composition of this invention was prepared by blending the following ingredients to homogeneity:

400 parts by weight of the silver particles described in the immediately preceding paragraph;
100 weight parts dimethylvinylsiloxy-endblocked polydimethylsiloxane with a viscosity of 2,000 centipoise (2 Pa.s) and a vinyl content of 0.2 weight percent,
1 part by weight of a trimethylsiloxy-endblocked polymethylhydrogensiloxane with a viscosity of 30 centipoise and a silicon-bonded hydrogen content of 1.5 weight percent,
7 parts by weight of 3-glycidoxypropyltrimethoxysilane,
a quantity of a chloroplatinic acid/olefin complex equivalent to 5 ppm, based on the total weight of the curable composition, of complexed platinum metal, and 300 ppm, based on the total weight of the curable composition, of phenylbutynol as a catalyst inhibitor.

The appearance and curability of the resultant curable composition together with the adhesion, contact resistance and volume resistivity of the elastomer prepared by curing the composition were evaluated and the results are reported in Table 1.

EXAMPLE 8

Silver particles with an average particle diameter not exceeding 1 micrometer, prepared by the reduction of silver nitrate, was ground in a ball mill using as lubricant a Carbitol acetate solution of a dimethylvinylsiloxy-endblocked polydimethylsiloxane exhibiting a viscosity of 100 centipoise (0.1 Pa.s) and containing 0.2 weight percent vinyl. Following the grinding operation the excess dimethylpolysiloxane adhering on the surface of the silver particles was removed by washing the particles with xylene, which yielded particles in the form of flakes with an average particle diameter of 4 micrometers.

A curable organosiloxane composition of the present invention was prepared by blending the following ingredients to homogeneity:

400 parts by weight of the silver particles described in the immediately preceding paragraph;
100 parts by weight of dimethylvinylsiloxy-endblocked polydimethylsiloxane with a viscosity of 2,000 centipoise (2 Pa.s) and a vinyl content of 0.2 weight percent,
1 part by weight of a trimethylsiloxy-endblocked polymethylhydrogensiloxane with a viscosity of 30 centipoise (0.03 Pa.s) and a silicon-bonded hydrogen content of 1.5 weight percent, a quantity of chloroplatinic acid/vinylsiloxane complex equivalent to 5 ppm, based on the weight of the curable composition, of complexed platinum metal, and
300 ppm, based on the total weight of the curable composition, of phenylbutynol as a catalyst inhibitor.

The appearance and curability of the resultant curable composition together with the adhesion, contact resistance and volume resistivity of the elastomer prepared by curing the composition were evaluated and the results are reported in Table 1.

COMPARATIVE EXAMPLE 4

Silver particles with an average particle diameter not exceeding 3 micrometers, prepared by the reduction of silver nitrate, were ground in a ball mill using stearic acid as lubricant. Following the grinding operation the excess stearic acid adhering on the surface of the silver particles were removed by washing with xylene, which yielded particles in the form of flakes with an average particle diameter of 4 micrometers.

A curable organosiloxane composition outside the scope of the present invention was prepared by combining the following ingredients to homogeneity:

400 parts by weight of the silver flake described in the immediately preceding paragraph;
100 parts by weight of a dimethylvinylsiloxy-endblocked polydimethylsiloxane with a viscosity of 2,000 centipoise (2 Pa.s) and a vinyl content of 0.2 weight percent,
1 part by weight of a trimethylsiloxy-endblocked polymethyl-hydrogen siloxane with a viscosity of 30 centipoise (0.03 Pa.s) and a silicon-bonded hydrogen content of 1.5 weight percent;
A quantity of a chloroplatinic acid/olefin complex equivalent to 5 ppm, based on the total weight of the curable composition, of complexed platinum metal, and
300 ppm, based on the weight of the curable composition, of phenylbutynol as a catalyst inhibitor.

The appearance and curability of the resultant curable composition together with the adhesion, contact resistance and volume resistivity of the elastomer prepared by curing the composition were evaluated and the results are reported in Table 2.

EXAMPLE 9

Silver particles with diameters not exceeding 1 micrometer and prepared by the reduction of silver nitrate, were ground in a ball mill using vinyltrimethoxysilane as lubricant. Following the grinding operation the excess vinyltrimethoxysilane adhering on the surface of the silver particles were removed by washing with xylene, which yielded silver flake with an average particle diameter of 2 micrometers.

A curable organosiloxane composition of the present invention was prepared by blending the following ingredients to homogeneity:

480 parts by weight of the silver flake particles described in the immediately preceding paragraph;
100 parts by weight of a dimethylvinylsiloxy-endblocked polydimethylsiloxane with a viscosity of 2,000 centipoise (2 Pa.s) and a vinyl content of 0.2 weight percent;
3 parts by weight of a trimethylsiloxy-endblocked polymethylhydrogensiloxane with a viscosity of 30 centipoise (0.03 Pa.s) and a silicon-bonded hydrogen content of 1.5 weight percent;
14 parts by weight of an organosilicon compound with the formula

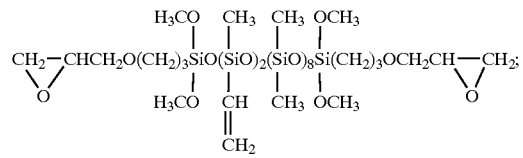

a quantity of a chloroplatinic acid/vinylsiloxane complex equivalent to 10 ppm, based on the weight of the curable composition, of complexed platinum metal, and
400 ppm, based on the weight of the curable composition, of phenylbutynol as a catalyst inhibitor.

The appearance and curability of the resultant curable composition together with the adhesion, contact resistance and volume resistivity of the elastomer prepared by curing the composition were evaluated and the results are reported in Table 1.

COMPARATIVE EXAMPLE 5

Silver particles with an average particle diameter not exceeding 3 micrometer were prepared by the reduction of silver nitrate using hydrazine. These particles were ground in a ball mill using stearic acid as lubricant. Following grinding the excess stearic acid adhering on the surface of the silver particles was removed by washing the particles with xylene, yielding particles in the form of flakes with an average diameter of 4 micrometers.

An electrically conductive silicone rubber composition was subsequently prepared by blending the following ingredients to homogeneity:

480 parts by weight of the silver flakes described in the immediately preceding paragraph, 100 parts by weight of a dimethylvinylsiloxy-endblocked polydimethylsiloxane with a viscosity of 2,000 centipoise (2 Pa.s) and containing 0.2 weight percent vinyl, 3 parts by weight of a trimethylsiloxy-endblocked polymethylhydrogensiloxane with a viscosity of 30 centipoise (0.03 Pa.s) and containing 1.5 weight percent of silicon-bonded hydrogen, 14 parts by weight of an organosilicon compound with the formula

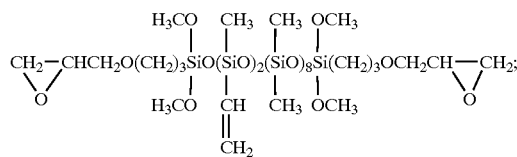

a quantity of a chloroplatinic acid/vinylsiloxane complex sufficient to provide 10 ppm, based on the weight of the curable composition, of complexed platinum metal; and 400 ppm, based on the weight of the curable composition, of phenylbutynol as a catalyst inhibitor.

The appearance and curability of the resultant curable composition together with the adhesion, contact resistance and volume resistivity of the elastomer prepared by curing the composition were evaluated and the results are reported in Table 2.

EXAMPLE 10

A mixture containing 1) 25 weight percent of reduced silver particles with an average particle diameter not exceeding 2 micrometers and prepared by the reduction of silver nitrate using hydrazine and 2) 75 weight percent atomized silver particles with an average particle diameter not exceeding 2 micrometers was ground in a ball mill using as lubricant the Carbitol acetate solution of a phenyl-containing silicone resin described in Example 1 of the present specification.

Following the grinding operation the excess silicone resin adhering on the surface of the silver particles was removed by washing with xylene, yielding particles in the form of flakes with an average diameter of 3 micrometers.

A curable organosiloxane composition of the present invention was prepared by blending the following ingredients to homogeneity:

450 weight parts of the silver particles described in the immediately preceding paragraph;
100 weight parts of a mixture of dimethylvinylsiloxy-endblocked dimethylpolysiloxane and an organosiloxane resin containing the repeating units $(CH_3)_3SiO_{1/2}$ and $SiO_{4/2}$ the mixture exhibiting a viscosity of 8,000 centipoise (8 Pa.s) and a vinyl content of 0.8 weight percent;
10 parts by weight of hydrophobicized fume silica,
7 weight parts of an organosilicon compound with the formula

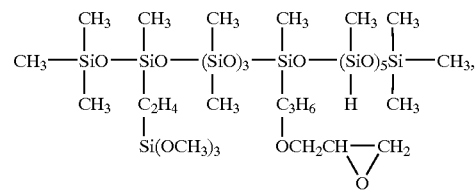

and a quantity of a microencapsulated chloroplatinic acid/vinylsiloxane complex equivalent to 10 ppm of platinum, based on the weight of the curable composition.

The catalyst was a dispersion of the chloroplatinic acid complex in a thermoplastic organosiloxane resin with a softening point of 80° C. to 90° C., The appearance and curability of the resultant curable composition together with the adhesion, contact resistance and volume resistivity of the elastomer prepared by curing the composition were evaluated and the results are reported in Table 1.

TABLE 1

|  | Invention Examples | | | | | | | | | |
|---|---|---|---|---|---|---|---|---|---|---|
|  | Example 1 | Example 2 | Example 3 | Example 4 | Example 5 | Example 6 | Example 7 | Example 8 | Example 9 | Example 10 |
| Untreated silver | reduced silver | reduced silver | atomized silver | reduced silver | reduced silver | electro-lytic silver | reduced silver | reduced silver | reduced silver | reduced + atomized silver |
| Surface-treatment Silver powder after surface treatment | MPSR | MPSR | DMPS | DMPS | VTMS | MPSR | TMES | DMPS | VTMS | MPSR |
| Average particle diameter (μm) | 1 | 8 | 10 | 4 | 2 | 12 | 4 | 4 | 2 | 3 |
| Shape | granular | flake | flake | flake | flake | flake | flake | flake | flake | flake |
| Appearance of the silicon rubber compositions |  |  |  |  |  |  |  |  |  |  |
| initial | uniform | uniform | uniform | uniform | uniform | uniform | uniform | uniform | uniform | uniform |
| after 1 mo | uniform | uniform | uniform | uniform | uniform | uniform | uniform | uniform | uniform | uniform |
| after 3 mos. | uniform | uniform | uniform | uniform | uniform | uniform | uniform | uniform | uniform | uniform |
| after 6 mos. | uniform | uniform | uniform | uniform | uniform | uniform | uniform | uniform | uniform | uniform |
| Hardness of the silicone rubbers (JIS A) |  |  |  |  |  |  |  |  |  |  |
| initial | 60 | 55 | 80 | 55 | 65 | 65 | 57 | 55 | 65 | 60 |

TABLE 1-continued

|  | Invention Examples | | | | | | | | | |
|---|---|---|---|---|---|---|---|---|---|---|
|  | Example 1 | Example 2 | Example 3 | Example 4 | Example 5 | Example 6 | Example 7 | Example 8 | Example 9 | Example 10 |
| after 1 mo. | 60 | 55 | 80 | 55 | 65 | 65 | 57 | 55 | 65 | 60 |
| after 3 mos. | 58 | 55 | 80 | 55 | 65 | 64 | 57 | 55 | 65 | 60 |
| after 6 mos. | 58 | 54 | 80 | 54 | 64 | 63 | 56 | 54 | 65 | 60 |
| Contact resistance of the silicone rubbers (ohms) | | | | | | | | | | |
| initial | 0.8 | 0.4 | 1.0 | 0.2 | 0.2 | 0.5 | 0.5 | 0.8 | 0.2 | 0.8 |
| after 100 hrs. | 0.9 | 0.4 | 1.0 | 0.3 | 0.5 | 0.6 | 0.5 | NM | 0.2 | 0.8 |
| after 500 hrs. | 0.9 | 0.5 | 1.0 | 0.5 | 0.6 | 0.6 | 0.5 | NM | 0.3 | 0.9 |
| after 1000 hrs. | 1.0 | 0.7 | 1.0 | 0.5 | 0.9 | 0.7 | 0.5 | NM | 0.3 | 0.9 |
| Volume resistivity of the silicone rubbers (ohm-cm) | | | | | | | | | | |
| initial | $6 \times 10^{-1}$ | $4 \times 10^{-4}$ | $4 \times 10^{-2}$ | $4 \times 10^{-4}$ | $2 \times 10^{-4}$ | $1 \times 10^{-3}$ | $6 \times 10^{-4}$ | $4 \times 10^{-4}$ | $2 \times 10^{-4}$ | $2 \times 10^{-4}$ |
| 100 hrs. | $6 \times 10^{-1}$ | $4 \times 10^{-4}$ | $4 \times 10^{-2}$ | $4 \times 10^{-4}$ | $2 \times 10^{-4}$ | $1 \times 10^{-3}$ | $6 \times 10^{-4}$ | $4 \times 10^{-4}$ | $2 \times 10^{-4}$ | $2 \times 10^{-4}$ |
| after 500 hrs. | $6 \times 10^{-1}$ | $4 \times 10^{-4}$ | $5 \times 10^{-2}$ | $5 \times 10^{-4}$ | $4 \times 10^{-4}$ | $1 \times 10^{-3}$ | $7 \times 10^{-4}$ | $4 \times 10^{-4}$ | $4 \times 10^{-4}$ | $3 \times 10^{-4}$ |
| after 1000 hrs. | $7 \times 10^{-1}$ | $4 \times 10^{-4}$ | $5 \times 10^{-2}$ | $5 \times 10^{-4}$ | $5 \times 10^{-4}$ | $1 \times 10^{-3}$ | $8 \times 10^{-4}$ | $5 \times 10^{-4}$ | $5 \times 10^{-4}$ | $3 \times 10^{-4}$ |
| Adhesion | part. AF | part. AF | TCF | CF | part. AF | part. AF | part. AF | AF | CF | CF | definitions of abbreviations used in the table:
MPSR = methylphenylsiloxane resin
VTMS = vinyltrimethoxysilane
NM = could not be measured
DMPS = dimethylpolysiloxane
TMES = trimethylethoxysilane
part. AF = Partial adhesive failure

TABLE 2

|  | Comparative Examples | | | | |
|---|---|---|---|---|---|
|  | Comp. Ex. 1 | Comp. Ex. 2 | Comp. Ex. 3 | Comp. Ex. 4 | Comp. Ex. 5 |
| Untreated silver particles | reduced silver | reduced silver | reduced silver | reduced silver | reduced silver |
| Surface treating agent | none | stearic acid | stearic acid | stearic acid | stearic acid |
| Silver particles after surface treatment | | | | | |
| avg. particle diameter (micrometers) | 1 | 8 | 4 | 4 | 4 |
| shape | granular | flake | flake | flake | flake |
| Appearance of the silicone rubber compositions | | | | | |
| initial | uniform | uniform | uniform | uniform | uniform |
| after 1 month | PS | PS | PS | PS | PS |
| after 3 months | PS | PS | PS | PS | PS |
| after 6 months | PS | PS | PS | PS | PS |
| Hardness of the silicone rubber (JIS A) | | | | | |
| initial | 55 | 55 | 52 | 52 | 65 |
| after 1 month | 50 | 40 | 40 | 40 | 60 |
| after 3 months | 20 | not cured | not cured | not cured | 40 |
| after 6 months | not cured | not cured | not cured | not cured | not cured |
| Contact resistance of the silicone rubbers (ohms) | | | | | |
| initial | 2.0 | 0.6 | 0.4 | 0.4 | 0.4 |
| after 100 hours | 5.0 | 1.0 | 2.0 | NM | 1.0 |
| after 500 hours | 10.0 | 12.0 | 12.0 | NM | 11.2 |
| after 1000 hours | 15.0 | 20.0 | 18.0 | NM | 22.0 |

TABLE 2-continued

| | Comparative Examples | | | | |
|---|---|---|---|---|---|
| | Comp. Ex. 1 | Comp. Ex. 2 | Comp. Ex. 3 | Comp. Ex. 4 | Comp. Ex. 5 |
| Volume resistivity of the silicone rubbers (ohm-cm) | | | | | |
| initial | $4 \times 10^{-2}$ | $6 \times 10^{-4}$ | $8 \times 10^{-3}$ | $8 \times 10^{-3}$ | $8 \times 10^{-4}$ |
| after 100 hours | $4 \times 10^{-2}$ | $10 \times 10^{-4}$ | $15 \times 10^{-3}$ | $20 \times 10^{-3}$ | $9 \times 10^{-4}$ |
| after 500 hours | $10 \times 10^{-2}$ | $15 \times 10^{-4}$ | $50 \times 10^{-2}$ | 0.5 | $10 \times 10^{-4}$ |
| after 1000 hours | $20 \times 10^{-2}$ | $20 \times 10^{-4}$ | $80 \times 10^{-1}$ | 5.0 | $12 \times 10^{-4}$ |
| adhesion of the silicone rubber | partial AF | partial AF | partial AF | AF | CF | definitions of abbreviations used in the table:
NM = could not be measured
PS = phase separation That which is claimed is:

1. A composition comprising the product obtained by blending to homogeneity:
   (A) 100 parts by weight of a polyorganosiloxane containing at least two alkenyl radicals per molecule;
   (B) an organohydrogensiloxane containing at least two silicon-bonded hydrogen atoms in each molecule, in a quantity sufficient to provide from 0.5 to 3 silicon-bonded hydrogen atoms per alkenyl radical in ingredient (A);
   (C) from 50 to 2,000 parts by weight of finely divided silver particles pre-treated with an organosilicon compound selected from the group consisting of (i) silanes containing at least one alkoxy group selected from the group consisting of methyltrimethoxysilane, vinyltrimethoxysilane, 3-glycidoxypropyltrimethoxysilane, 3-methacryloxypropyltrimethoxysilane, dimethyldimethoxysilane, trimethylmethoxysilane, trimethylethoxysilane, tetramethoxysilane and tetraethoxysilane and (ii) organosiloxanes selected from the group consisting of:
   (a) a resin comprising $R_3SiO_{1/2}$ and $SiO_{4/2}$ units,
   (b) a resin comprising $RSiO_{3/2}$ units,
   (c) a resin comprising $R_2SiO_{2/2}$ and $RSiO3/2$ units, and
   (d) a resin comprising $R_2SiO_{2/2}$, $RSiO_{3/2}$ and $SiO_{4/2}$ units,
   wherein each R represents a substituted or unsubstituted monovalent hydrocarbon;
   (D) an amount sufficient to promote curing of said composition of a platinum catalyst;
   (E) up to 20 weight percent, based on the weight of component (A), of ingredient (E), an organosilicon compound containing at least one silicon-bonded alkoxy group per molecule; and
   (F) 0.001 to 5 weight parts, per 100 weight parts of ingredient (A), of a cure inhibitor.

2. The composition of claim 1, where ingredient (C)(ii) comprises
   (a) a siloxane oligomer,
   (b) a linear polyorganosiloxane,
   (c) a cyclosiloxane,
   (d) a silicone resin, or
   (e) a mixture thereof.

3. The composition of claim 1, where ingredient (C)(ii) comprises a siloxane oligomer comprising:
   (a) a silanol endblocked dimethylsiloxane oligomer,
   (b) a silanol endblocked dimethylsiloxane/methylvinylsiloxane co-oligomer,
   (c) a silanol endblocked methylvinylsiloxane oligomer, or
   (d) a silanol endblocked methylphenylsiloxane oligomer.

4. The composition of claim 1, where ingredient (C)(ii) comprises a linear polyorganosiloxane comprising:
   (a) a trimethylsiloxy endblocked polydimethylsiloxane,
   (b) a trimethylsiloxy endblocked dimethylsiloxane/methylvinylsiloxane copolymer,
   (c) a trimethylsiloxy endblocked dimethylsiloxane/methylphenylsiloxane copolymer,
   (d) a trimethylsiloxy endblocked polymethylhydrogensiloxane,
   (e) a trimethylsiloxy endblocked dimethylsiloxane/methylhydrogen siloxane copolymer,
   (f) a silanol endblocked polydimethylsiloxane,
   (g) a silanol endblocked dimethylsiloxane/methylvinylsiloxane copolymer,
   (h) a silanol endblocked dimethylsiloxane/methylphenylsiloxane copolymer,
   (i) a silanol endblocked polydimethylhydrogensiloxane,
   (j) a silanol endblocked dimethylsiloxane/methylhydrogensiloxane copolymer,
   (k) a dimethylvinylsiloxy endblocked polydimethylsiloxane,
   (l) a dimethylvinylsiloxy endblocked dimethylsiloxane/methylvinylsiloxane copolymer,
   (m) a dimethylvinylsiloxy endblocked dimethylsiloxane/methylphenylsiloxane copolymer,
   (n) a dimethylhydrogensiloxy endblocked polymethylhydrogensiloxane, or
   (o) a dimethylhydrogensiloxy endblocked dimethylsiloxane/methylhydrogensiloxane copolymer.

5. The composition of claim 1, where ingredient (C)(ii) comprises a cyclosiloxane comprising 1,3,5,7-tetramethylcyclotetrasiloxane or 1,3,5,7,9-pentamethylcyclopentasiloxane.

6. The composition of claim 1, where the composition contains 0.5 to 8 parts by weight of ingredient (E), per 100 parts by weight of ingredient (A), and ingredient (E) further comprises at least one substituent selected from the group consisting of silicon bonded hydrogen, silicon-bonded vinyl, epoxy and trialkoxysilylalkyl radicals.

7. The composition of claim 1, where ingredient (E) comprises an organosilicon compound comprising:

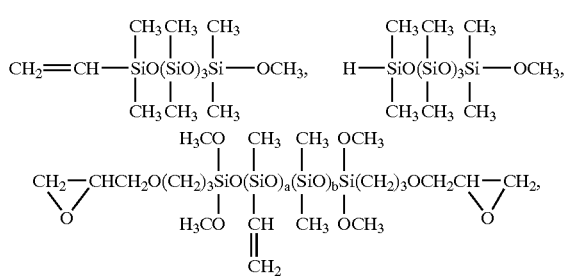

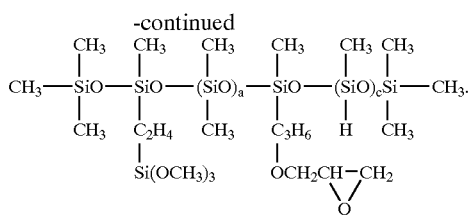

where a and b are each integers with values of at least 1,

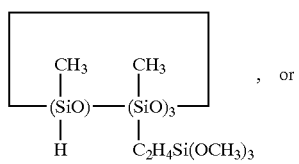

8. The composition of claim 1, where ingredient (F) comprises an alkynyl alcohol, an ene-yne compound, 1,3,5,7-tetramethyl-1,3,5,7-tetravinylcyclotetrasiloxane, 1,3,5,7-tetramethyl-1,3,5,7-tetrahexenylcyclotetrasiloxane or benzotriazole.

9. The composition of claim 1, where ingredient (B) has at least one silicon-bonded alkoxy group per molecule and ingredient (E) has not more than one silicon-bonded hydrogen atom per molecule.

10. The composition of claim 1 when cured on a solid substrate.

* * * * *